United States Patent
Vorderbruggen et al.

(10) Patent No.: US 8,636,068 B2
(45) Date of Patent: Jan. 28, 2014

(54) METHOD OF REDUCING CORROSION IN CEMENT

(75) Inventors: Mark Alan Vorderbruggen, Spring, TX (US); Richard F. Stevens, Sugar Land, TX (US); Qi Qu, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 700 days.

(21) Appl. No.: 12/180,577

(22) Filed: Jul. 28, 2008

(65) Prior Publication Data

US 2010/0018435 A1   Jan. 28, 2010

(51) Int. Cl.
| | |
|---|---|
| *E21B 33/13* | (2006.01) |
| *C04B 7/32* | (2006.01) |
| *C04B 7/36* | (2006.01) |
| *C04B 9/11* | (2006.01) |
| *C04B 11/28* | (2006.01) |
| *C04B 28/06* | (2006.01) |
| *C04B 14/00* | (2006.01) |
| *C04B 18/00* | (2006.01) |
| *C04B 7/00* | (2006.01) |
| *C04B 9/12* | (2006.01) |
| *C04B 28/00* | (2006.01) |
| *C04B 28/04* | (2006.01) |
| *C04B 16/00* | (2006.01) |
| *C04B 24/00* | (2006.01) |
| *C04B 28/10* | (2006.01) |

(52) U.S. Cl.
USPC ........... 166/293; 106/707; 106/713; 106/717; 106/692

(58) Field of Classification Search
USPC .................. 106/713, 717, 707, 692; 166/293
See application file for complete search history.

(56) References Cited

U.S. PATENT DOCUMENTS

| | | | | |
|---|---|---|---|---|
| 4,871,395 | A  * | 10/1989 | Sugama ........................ | 106/678 |
| 5,968,255 | A  * | 10/1999 | Mehta et al. .................. | 106/724 |
| 6,332,921 | B1 | 12/2001 | Brothers et al. | |
| 6,494,951 | B1 * | 12/2002 | Reddy et al. .................. | 106/705 |
| 6,904,971 | B2 * | 6/2005 | Brothers et al. ............... | 166/293 |

FOREIGN PATENT DOCUMENTS

EP    0174053    * 12/1986

OTHER PUBLICATIONS

Duguid, Andrew. "The Effect of Carbonic Acid on Well Cements". 2006 [Retrieved on Apr. 7, 2011]. Retrieved from [http://adsabs.harvard.edu/abs/2006PhDT........84D].*
Anthony, Dr. J Floor. The Chemical Composition of Seawater. 2006 [Retrieved on Apr. 18, 2012]. Retrieved from http://www.seafriends.org.nz/oceano/seawater.htm#gases.*

* cited by examiner

*Primary Examiner* — Kaj K Olsen
*Assistant Examiner* — Karam Hijji
(74) *Attorney, Agent, or Firm* — John Wilson Jones; Jones & Smith, LLP

(57) ABSTRACT

Methods and compositions that protect cement compositions from corrosion, particularly from wet carbon dioxide, are provided. A soluble salt additive is provided to react with reaction products generated during the reactions that occur when cement is exposed to wet carbon dioxide. The soluble salt reacts to form an insoluble salt that forms a protective layer on the surface of the cement that protects it from further corrosion from exposure to wet carbon dioxide.

19 Claims, 3 Drawing Sheets

METHOD OF REDUCING CORROSION IN CEMENT

BACKGROUND OF THE INVENTION

1. Field of the Invention

The invention relates generally to compositions and methods of reducing corrosion in cement exposed to carbon dioxide.

2. Description of the Related Art

Cement, such as Portland cement, is ubiquitous in wells for sealing the well casing to the formation, isolating zones, plugging old wells, squeeze cementing treatments, cementing of steam producing or injection wells, disposal wells, and permafrost environments, remediating failed cement, and many other uses. Cement is also used in many civil engineering projects such as roads, bridges, dams, and buildings. In all of these applications, cement can suffer corrosion due to acidic contaminants or direct contact with acidic liquid, particularly wet carbon dioxide ($CO_2$). When carbon dioxide dissolves in water, carbonic acid is formed. This acid then attacks the calcium hydroxide found in the cement, resulting in corrosion and failure of the cement. This issue is especially problematic in sour wells (producing $CO_2$ and $H_2S$ containing oil and gas) and $CO_2$ injection wells. $CO_2$ injection is a process used to enhance crude oil recovery and more recently, is a possible method of sequestering greenhouse gases in underground aquifers.

When carbon dioxide is exposed to water, carbonic acid ($H_2CO_3$) is formed using the following equation: $CO_2 + H_2O \rightarrow H_2CO_3$. Carbonic acid can then attack calcium hydroxide that is a major component present in cement compositions through the following reaction: $H_2CO_3 + Ca(OH)_2 \rightarrow CaCO_3 + 2.H_2O$. As the continuous exposure of the cement to wet $CO_2$ or carbonic acid continues, the calcium carbonate can react with carbonic acid to produce water soluble calcium bicarbonate using the following equation: $CaCO_3 + H_2CO_3 \rightarrow Ca(HCO_3)_2$, which opens up the channels for further carbonic acid propagation into cement mass and causes further corrosion of the cement.

To alleviate the problems associated with $CO_2$ corrosion, attempts have been made to develop cement compositions that are resistant to $CO_2$ and its effects. If a well is cemented with $CO_2$ resistant cement during well construction, it will have extended life when it is used either as a $CO_2$ injection well or as a $CO_2$ producing well. In one such example, the cement has some or all of the Portland cement replaced by fly ash and/or calcium aluminate. Such cements have been used in petroleum and geothermal wells ranging in temperature from 140° F. to 300° F. and have been evaluated in laboratory experiments up to 700° F. Under such conditions, regular Portland cement suffers large amounts of corrosion. These fly ash/calcium aluminate cements are somewhat effective at reducing corrosion, but they are more expensive and difficult to apply due to their sensitivity to contamination. Calcium aluminate cement will flash set if it comes into contact with any normal Portland cement. This prevents the same equipment from being used to pump both Portland and calcium aluminate cements, a whole separate fleet of pumping equipment must be retained.

A need exists for methods and compositions useful for reducing corrosion in cement applications, such as in wet $CO_2$ environments. It would be useful if the additives were compatible with all types of cements to enable the same equipment to be used when handling cement compositions without the corrosion inhibitors.

SUMMARY OF THE INVENTION

In view of the foregoing, methods and compositions useful for reducing corrosion in cement compositions exposed to corrosive environments are provided as embodiments of the present invention. A method of reducing corrosion in cement applications is provided as a first embodiment of the present invention. In this embodiment, an additive is added to a cement composition to reduce corrosion in cement applications. The additive is capable of forming an insoluble salt by reacting with a calcium cation or a carbonate anion that forms after the cement composition sets up, hardens, and begins to corrode after exposure to wet $CO_2$. The insoluble salts form a protective composition within the cement mass that prevents carbonic acid from propagation within the cement and protects it from further corrosion.

In another embodiment, an additive is added to a cement composition to reduce corrosion in cement applications. The additive is capable of forming an insoluble salt by reacting with a calcium cation or a carbonate anion that forms during cement composition set up and hardening, while corroding after exposure to $CO_2$. The insoluble salts form a protective composition within the cement mass that prevents carbonic acid from propagation within the cement and protects it from further corrosion.

As another embodiment of the present invention, another method of reducing corrosion in a cement composition is provided. In this embodiment, a cement composition comprising an additive is formed. The cement composition is then allowed to set into a hard mass that is then exposed to wet carbon dioxide to produce a calcium cation, calcium carbonate, or a combination thereof. The calcium cation or the carbonate anion is reacted with the additive to produce an insoluble salt that protects the hard mass from corrosion.

Besides the method embodiments, compositional embodiments of the present invention are also provided. In one such embodiment, a cement composition including an additive is provided. The additive is capable of forming an insoluble salt by reacting with a calcium cation or carbonate anion that forms when the cement composition sets up, hardens, and begins to corrode.

In an aspect, the additive is a soluble salt that is capable of forming an insoluble salt that is capable of protecting the cement from further corrosion, particularly from $CO_2$. The methods and compositions described herein can be used in various cement applications that are exposed to acidic contaminants, such as $CO_2$, that cause cement to corrode. The methods and compositions also can be used with various types of cement. The methods and compositions described herein also can be used in various cement applications to control gas migration caused by cracks or improper cementing and worsened by exposure to acidic contaminants, such as $CO_2$, that cause cement to corrode and intensify gas migration.

Figure 1:
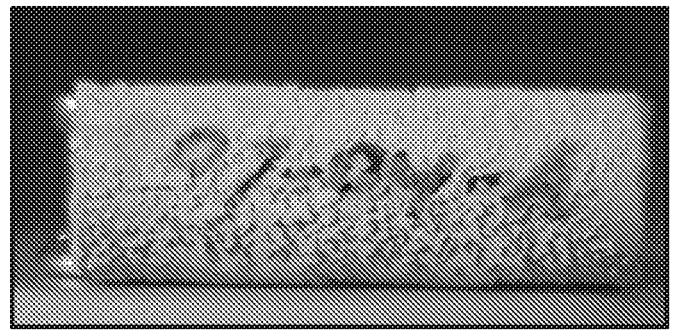
FIG. 1 is a perspective view of a cement sample made in accordance with prior art methods after a 20 day test showing corrosion.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

Illustrative embodiments of the invention are described below as they might be employed in the operation and in the treatment of cement applications. In the interest of clarity, not all features of an actual implementation are described in this specification. It will of course be appreciated that in the development of any such actual embodiment, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

The present invention relates to methods and compositions that can protect various types of cement from corrosion in $CO_2$ wet environments. Embodiments of the present invention use an additive to stop the reactions that cause and/or contribute to the corrosion of the cement and produce insoluble salts that form a protective composition within the cement to prevent further corrosion. The two types of additives useful in the present invention are independent and can be used separately or can be combined, if compatible.

As indicated previously, when carbon dioxide is exposed to water, carbonic acid ($H_2CO_3$) is formed using the following equation: $CO_2+H_2O \rightarrow H_2CO_3$. Carbonic acid can then attack calcium hydroxide that is present in cement compositions to produce calcium carbonate. As the continuous exposure of the cement to wet $CO_2$ or carbonic acid continues, the calcium carbonate can react with carbonic acid to produce water soluble calcium bicarbonate using the following equation: $CaCO_3+H_2CO_3 \rightarrow Ca(HCO_3)_2$, which opens up the channels for further carbonic acid propagation into the cement mass and cause further corrosion to the cement. As the $CO_2$ or carbonic acid continues to react and attack calcium hydroxide in the cement composition, the corrosion propagates.

The methods and compositions of the present invention stop the corrosion cycle of cement and protect it from further corrosion. One type of additive stops the calcium cations from being solubilized by wet $CO_2$ infusion. This type of additive can include a fluoride-containing additive, a phosphate-containing additive, a borate-forming chemical, or a combination thereof. This type of additive reacts with the calcium cations produced from the carbonic acid corrosion to form an insoluble salt, such as calcium fluoride or tricalcium phosphate, that is not further reacting with carbonic acid or $CO_2$ to product other soluble components. This insoluble salt forms a protective composition that remains in place to prevent $CO_2$ from penetrating into the cement body and causing loss of cement integrity.

Another type of additive also helps to prevent further corrosion of the cement by reacting with available carbonate or carbonic acid to stop the calcium hydroxide within the cement from reacting with the carbonic acid. This second type of additive reacts with the carbonic acid or carbonate to produce an insoluble salt to protect the cement. The insoluble salt forms a protective composition that remains in place to prevent $CO_2$ from penetrating into the cement body and causing loss of cement integrity.

The methods and compositions described herein allow for a small amount of corrosion initially to produce the calcium cations, but then stop the calcium cations and/or carbonate anions from reacting further. The insoluble salts that are formed as a result of the reactions with the additives in the cement and create a protective barrier within the pathway of the $CO_2$ or carbonic acid intrusion into the cement body. In essence, the two types of additives enable the cement to be self-healing. The additives enable the cement composition to stop penetration of the carbon dioxide through the cement and stop further propagation of the carbon dioxide.

As an embodiment of the present invention, a method of reducing corrosion in cement applications is provided. In this embodiment, an additive is added to a cement composition. After the cement composition sets up and hardens, it will begin to corrode when exposed to wet $CO_2$. As indicated previously, the $H_2O+CO_2$ will react to produce carbonic acid, which will then react with the calcium hydroxide contained in cement to produce calcium cations. The additive is capable of forming an insoluble salt by reacting with the calcium cation or carbonate anion that forms after the cement composition sets up, hardens, and begins to corrode. The insoluble salt forms a protective barrier within the cement that remains in place to prevent further $CO_2$ from penetrating further into the cement body and cause loss of cement integrity.

As another embodiment of the present invention, a method of reducing corrosion in cement applications is provided. In this embodiment, an additive is added to a cement composition. As the cement composition sets up and hardens, it will begin to corrode when exposed to $CO_2$. As indicated previously, the $H_2O+CO_2$ will react to produce carbonic acid, which will then react with the calcium hydroxide contained in cement to produce calcium cations. The additive is capable of forming an insoluble salt by reacting with the calcium cation or carbonate anion that forms during which the cement composition sets up, hardens, and begins to corrode. The insoluble salt forms a protective barrier within the cement that remains in place to prevent further $CO_2$ from penetrating further into the cement body and cause loss of cement integrity.

As another embodiment of the present invention, a method of reducing corrosion in a cement composition is provided. In this embodiment, a cement composition is formed that includes an additive. The cement composition is then allowed to set into a hard mass. The hard mass is then exposed to wet carbon dioxide to produce a calcium cation, calcium bicarbonate, or a combination thereof. The calcium cation is reacted with the additive to produce an insoluble salt that protects the hard mass from corrosion.

Besides the method embodiments described herein, compositions are also provided as embodiments of the present invention. For example, in an embodiment, a cement composition comprising an additive is provided. In an aspect, the additive is capable of forming an insoluble salt by reacting with a calcium cation or a carbonate anion that forms when the cement composition sets up, hardens, and begins to corrode.

In an aspect, the additive can be any soluble salt that is capable of reacting with the calcium ion or the carbonate anion to produce an insoluble salt capable of forming a protective barrier within the cement that remains in place to prevent further $CO_2$ from penetrating further into the cement body and causing loss of cement integrity. For example, the additive can be fluoride salts or fluoride salts generating chemicals. Other possible salts include borate salts or borate-generating chemicals, phosphate salts or phosphate-generating salts. Examples include NaF, KF, $[NH_4][HF_2]$, $NH_4F$, LiF, fluoroboric acid or salts, borax, sodium or potassium borate, organic borate or borate esters, $H_2NaO_4P$, $Na_2HPO_4$, $Na_3PO_4$, $NH_4\cdot H_2PO_4$, $(NH_4)_3PO_4$, $(NH_4)_2HPO_4$, $KH_2PO_4$, $K_2HPO_4$, $K_3PO_4$, phosphate esters or combinations thereof. By using the additives described herein, the resulting insoluble salt can be calcium fluoride, tricalcium phosphate, calcium borate or combinations thereof.

Various types of soluble salts can be used as the additive in the present invention to produce insoluble salts capable of protecting the cement by reacting the soluble salts with any available calcium cations. The following examples include, but are not limited to, the varieties of available salts of fluoride, borate phosphate, or combinations thereof. When the desired insoluble salt formed to protect the cement is calcium fluoride, the following types of soluble fluoride salts can be used as suitable additives in the present invention: NaF, KF, $[NH_4][HF_2]$, $NH_4F$, LiF, as well as fluoride forming compounds and combinations thereof. When the desired insoluble salt formed to protect the cement is tricalcium phosphonate, the following types of soluble phosphonate salts can be used as suitable additives in the present invention: $H_2NaO_4P$, $Na_2HPO_4$, $Na_3PO_4$, $NH_4\cdot H_2PO_4$, $(NH_4)_3PO_4$, $(NH_4)_2HPO_4$, $KH_2PO_4$, $K_2HPO_4$, $K_3PO_4$, as well as organophosphates and combinations thereof. When the desired insoluble salt formed to protect the cement is calcium borate, the following types of soluble borate salts can be used as suitable additives in the present invention: $Na_4B_4O_7$ and its hydrate forms; $Na_2B_8O_{13}$ and its hydrate forms; other salts of polyborates, such as triborate, tetraborate, pentaborate, and the like; other borate forming compounds, such as fluoroborate acid or its salts; or combinations thereof. Other suitable types of soluble salts that are capable of reacting with the calcium cations and forming insoluble salts capable of protecting the cement will be apparent to those of skill in the art and are to be considered within the scope of the present invention.

In an aspect, another type of additive can be any soluble salt that is capable of reacting with the carbonate anions in the calcium carbonate to produce an insoluble salt to protect the surface of the cement. For example, the additive can be $FeCl_2$, $FeSiF_6\cdot 6H_2O$, $(Fe(NO_3)_2)$, $FeSO_4$, $Pb(C_2H_3O_2)_2$, $Pb(BrO_3)_2$, $PbSiF_6$, $Pb(NO_3)_2$, $MnF_2$, $MnSiF_6\cdot 6H_2O$, $Mn(NO_3)_2$, $MnSO_4$, $Hg_2(ClO_4)_2$, $Hg(C_2H_3O_2)_2$, $Hg(ClO_3)_2$, $HgCl_2$, $Hg(CN)_2$, $Nd(C_2H_3O_2)_3\cdot H_2O$, $Nd(BrO_3)_3$, $NdCl_3$, $Nd(NO_3)_3$, $Nd_2(SeO_4)_3$, $Nd_2(SO_4)_3$, $AgClO_3$, $AgClO_2$, $Ag_2Cr_2O_7$, AgF, $AgNO_3$, $AgClO_4$, $AgMnO_4$, $Ag_2SO_4$, $Sr(C_2H_3O_2)_2$, $Sr(BrO_3)_2\cdot H_2O$, $SrBr_2$, $SrCl_2$, $Sr(HCO_2)_2$, $Sr(OH)_2\cdot 8H_2O$, $SrI_2$, $Sr(NO_3)_2$, $Sr(NO_3)_2$, $SrS_2O_3\cdot 5H_2O$, $Y(C_2H_3O_2)_3\cdot 4H_2O$, $Y(BrO_3)_3\cdot 9H_2O$, $YBr_3$, $YCl_3$, $Y(NO_3)_3$, $Y(NO_3)_3$, $Y_2(SO_4)_3$, $Zn(C_2H_3O_2)_2$, $ZnBr_2$, $Zn(ClO_3)_2$, $ZnCl_2$, $ZnF_2$, $Zn(HCO_2)_2$, $ZnI_2$, $Zn(NO_3)_2$, $Zn(MnO_4)_2$, $ZnSO_4$, $Zr(SO_4)_2\cdot 4H_2O$, $ZrF_4$, or combinations thereof. By using the additives described herein, the resulting insoluble salt can be iron (II) carbonate, lead (II) carbonate, manganese (II) carbonate, mercury (I) carbonate, neodymium carbonate, silver (I) carbonate, strontium carbonate, yttrium carbonate, zinc carbonate, zinc carbonate monohydrate, or combinations thereof.

Various types of soluble salts can be used as the additive in the present invention to react with any available carbonate anions to produce insoluble salts capable of protecting the cement. Some possible insoluble salts that can be produced and used to protect the cement can include iron (II) carbonate, lead (II) carbonate, manganese (II) carbonate, mercury (I) carbonate, neodymium carbonate, silver (I) carbonate, strontium carbonate, yttrium carbonate, zinc carbonate, zinc carbonate monohydrate, and combinations thereof. When forming iron (II) carbonate, suitable additives can include iron (II) chloride ($FeCl_2$), ferrous fluorosilicate hexahydrate ($FeSiF_6\cdot 6H_2O$), iron (II) nitrate ($Fe(NO_3)_2$), $FeSO_4$, and combinations thereof. When forming lead (II) carbonate, suitable additives can include $Pb(C_2H_3O_2)_2$, $Pb(BrO_3)_2$, $PbSiF_6$, $Pb(NO_3)_2$, and combinations thereof. When forming manganese (II) carbonate, suitable additives can include $MnF_2$, $MnSiF_6\cdot 6H_2O$, $Mn(NO_3)_2$, $MnSO_4$, and combinations thereof. When forming mercury (I) carbonate, suitable additives can include $Hg_2(ClO_4)_2$, $Hg(C_2H_3O_2)_2$, $Hg(ClO_3)_2$, $HgCl_2$, $Hg(CN)_2$, and combinations thereof. When forming neodymium carbonate, suitable additives can include $Nd(C_2H_3O_2)_3\cdot H_2O$, $Nd(BrO_3)_3$, $NdCl_3$, $Nd(NO_3)_3$, $Nd_2(SeO_4)_3$, $Nd_2(SO_4)_3$, and combinations thereof. When forming silver (I) carbonate, suitable additives can include $AgClO_3$, $AgClO_2$, $Ag_2Cr_2O_7$, AgF, $AgNO_3$, $AgClO_4$, $AgMnO_4$, $Ag_2SO_4$, and combinations thereof. When forming strontium carbonate, suitable additives can include $Sr(C_2H_3O_2)_2$, $Sr(BrO_3)_2\cdot H_2O$, $SrBr_2$, $SrCl_2$, $Sr(HCO_2)_2$, $Sr(OH)_2\cdot 8H_2O$, $SrI_2$, $Sr(NO_3)_2$, $Sr(NO_3)_2$, $SrS_2O_3\cdot 5H_2O$, and combinations thereof. When forming yttrium carbonate, suitable additives can include $Y(C_2H_3O_2)_3\cdot 4H_2O$, $Y(BrO_3)_3\cdot 9H_2O$, $YBr_3$, $YCl_3$, $Y(NO_3)_3$, $Y(NO_3)_3$, $Y_2(SO_4)_3$, and combinations thereof. When forming zinc carbonate, suitable additives can include $Zn(C_2H_3O_2)_2$, $ZnBr_2$, $Zn(ClO_3)_2$, $ZnCl_2$, $ZnF_2$, $Zn(HCO_2)_2$, $ZnI_2$, $Zn(NO_3)_2$, $Zn(MnO_4)_2$, $ZnSO_4$, $Zr(SO_4)_2\cdot 4H_2O$, $ZrF_4$, and combinations thereof. When forming zinc carbonate monohydrate, suitable additives can include $Zn(C_2H_3O_2)_2$, $ZnBr_2$, $Zn(ClO_3)_2$, $ZnCl_2$, $ZnF_2$, $Zn(HCO_2)_2$, $ZnI_2$, $Zn(NO_3)_2$, $Zn(MnO_4)_2$, $ZnSO_4$, $Zr(SO_4)_2\cdot 4H_2O$, $ZrF_4$, and combinations thereof. Other suitable types of soluble salts that are capable of reacting with the carbonate anions and forming insoluble salts capable of protecting the cement will be apparent to those of skill in the art and are to be considered within the scope of the present invention.

The amounts of the additive can vary within the cement composition. The amount of the additives that can be added is an effective amount that protects the cement from corrosion. For example, the additive can be present in a range of about 1 lb. per 500 lb. cement composition to about 100 lb. per 500 lb. cement composition; or alternatively, in a range of about 1 lb. per 500 lb. cement composition to about 30 lb. per 500 lb. cement composition. In an aspect, the additive can be present in a range of about 1 mol. % to about 20 mol. %; or alternatively, in a range of about 10 mol. % to about 15 mol. %. Other suitable amounts of additives that can be added to protect the cement will be apparent to those of skill in the art and is to be considered within the scope of the present invention.

The methods and compositions described herein can be used with various types of cement compositions. For example, the methods and compositions described herein can be used with normal portland cement, high early strength portland cement, ultra high early strength portland cement, portland blast-furnace slag cement, moderate heat portland cement, fly ash cement, sulfate resisting cement, other hydraulic materials other than cement (such as gypsum), and combinations thereof. Other suitable types of materials that the present invention can be used with will be apparent to those of skill in the art and are to be considered within the scope of the present invention.

Besides the additives described herein, various additives that are commonly used in cement applications can be used in the present invention. Such additives can include glass, dispersing agents, fluid loss additives, hydrogen foaming agents, and the like. Other suitable additives that can be used in the present invention will be apparent to those of skill in the art and are to be considered within the scope of the present invention.

The cement compositions of this invention can be prepared in accordance with any of the mixing techniques utilized in the art. In one preferred method, a quantity of water is introduced into a cement blender followed by the additive. The mixture is agitated for a sufficient period of time to form a pumpable slurry. Other suitable preparation methods will be apparent to those of skill in the art and are to be considered within the scope of the present invention.

As an advantage of the present invention, the methods and compositions of the present invention can be used in various cement applications. For example, the methods and compositions described herein can be used in oilfield cement applications, smoke stacks, building subject to acid rain, and the like. Other suitable cement applications will be apparent to those of skill in the art and are to be considered within the scope of the present invention.

EXAMPLES

The following examples are included to demonstrate the use of compositions in accordance with embodiments of the present invention. It should be appreciated by those of skill in the art that the techniques disclosed in the examples that follow represent techniques discovered by the inventors to function well in the practice of the invention. However, those of skill in the art should, in light of the present disclosure, appreciate that many changes can be made in the specific embodiments that are disclosed and still obtain a like or similar result without departing from the scope of the invention.

Figure 2:
FIG. 2 is a perspective view of a cement sample made in accordance with embodiments of the present invention after a 20 day test showing minimal corrosion.

Two class H portland cement samples were made, one without the additive of the present invention (MAV07-04) and one with the additive of the present invention (MAV07-01), as described in API Practice 10B. The additive (ammonium bifluoride) had a loading rate of 13.2 grams/861 grams of cement. Samples of each cement were drawn up in 5 mL syringes and allowed to set for thirteen days at room temperature and atmospheric pressure. After the setting time, the cement plugs were extracted from the syringes, cut into sections 1.5 inches in length and placed in a 300 mL high pressure cell containing a 125 mL of 1 wt. % NaCl brine that had been saturated with $CO_2$. The cell was pressurized to 850 psi of $CO_2$ then placed in a 100° C. oven for nineteen days. During this time the pressure in the cell rose to 1200 psi after an hour in the oven but had dropped down to 1000 psi by the end of the nineteen days. At the end of the test, the cell was slowly cooled and depressurized over the course of five hours to avoid any shock damage to the cement. The cement samples were removed from the cell and photographed. FIG. 1 (Sample MAV2-07-04A) shows calcite deposits on its surface after twenty days of exposure to +1000 psi of $CO_2$ at 100° C. Calcite is the product of $CO_2$ corrosion of cement. FIG. 2 (Sample MAV2-07-01A) has no calcite deposits on its surface after twenty days of exposure to +1000 psi of $CO_2$ at 100° C.

Figure 3:
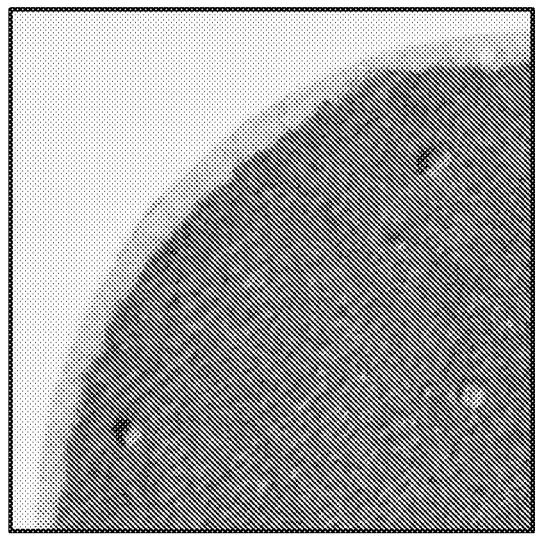
FIG. 3 is a partial cross-sectional area view of the cement sample of FIG. 1 made in accordance with prior art methods stained with 1 wt. % phenolphthalein showing corrosion.
Figure 4:
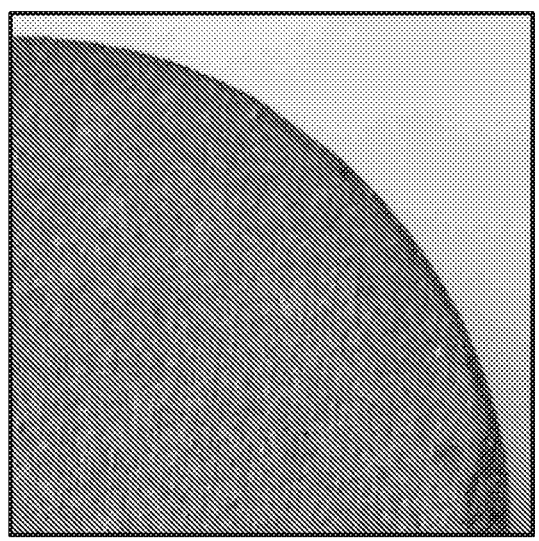
FIG. 4 is a partial cross-sectional area view of the cement sample of FIG. 2 made in accordance with embodiments of the present invention stained with 1 wt. % phenolphthalein.

The samples were then cut in half using a diamond saw and hydrocarbon lubricant, stained with 1 wt. % phenolphthalein, then photographed again. FIG. 3 (Sample MAV2-07-04) shows a corrosion depth of 0.253 mm upon twenty days of exposure to +1000 psi of $CO_2$ at 100° C. FIG. 4 (Sample MAV2-07-01) contains the additives described herein and shows no measurable corrosion under the same conditions upon twenty days of exposure to +1000 psi of $CO_2$ at 100° C.

Figure 5:
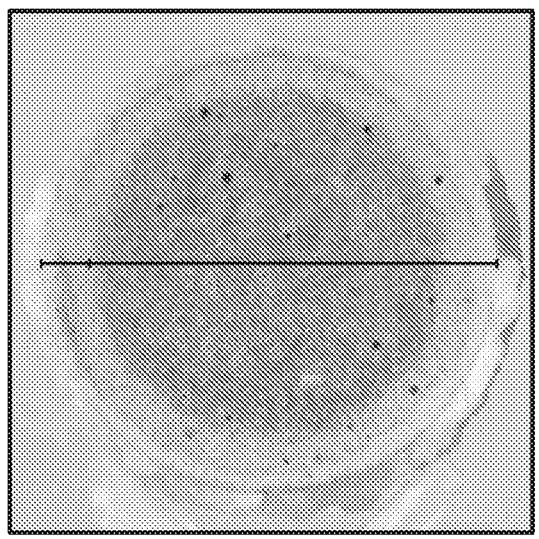
FIG. 5 is a cross-sectional area view of a cement sample made in accordance with prior art methods stained with 1 wt. % phenolphthalein after 40 days showing corrosion.
Figure 6:
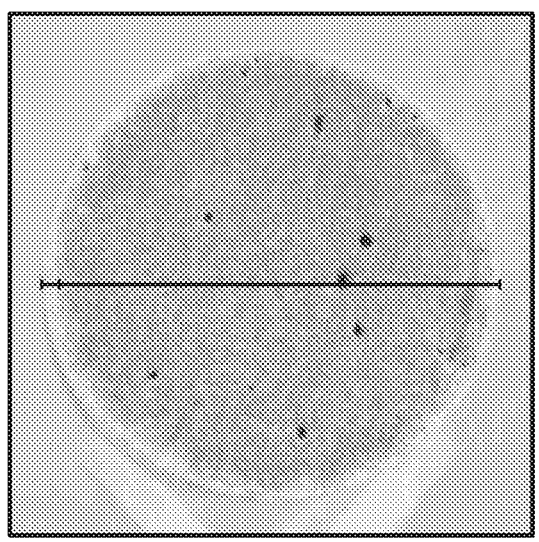
FIG. 6 is a cross-sectional area view of a cement sample made in accordance with embodiments of the present invention stained with 1 wt. % phenolphthalein after 40 days.

A second set of samples were exposed to $CO_2$ for forty days under the sample conditions as in the first example, followed by photographing them. FIG. 5 (Sample MAV2-07-04H) shows a corrosion depth of 1.245 mm upon forty days of exposure to +1000 psi of $CO_2$ at 100° C. FIG. 6 (Sample MAV2-07-01H) shows a substantially smaller amount of corrosion, with the depth only being 0.4397 mm upon forty days of exposure to +1000 psi of $CO_2$ at 100° C.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the methods described herein without departing from the concept, spirit and scope of the invention. More specifically, it will be apparent that certain agents that are chemically related can be substituted for the agents described herein while the same or similar results would be achieved. All such similar substitutes and modifications apparent to those skilled in the art are deemed to be within the scope and concept of the invention.

What is claimed is:

1. A method of reducing corrosion of a hardened cement in a well comprising:
   (i) hardening in a well a cement composition comprising Portland cement and an additive selected from the group consisting of NaF, KF, [$NH_4$][$HF_2$], $NH_4F$, LiF, $Na_2B_4O_7$, $Na_2B_4O_7 \cdot 10H_2O$, $B_2O_3$, $B_8Na_2O_{13}$, $BBr_3$, $BF_3$, $B_{10}H_{14}$, $B_2H_6$, $BH_3$, $K_2B_4O_7 \cdot 4H_2O$, $B(OH)_3$, $Na_4B_4O_7$ and its hydrate forms, $Na_2B_8O_{13}$ and its hydrate forms, or combinations thereof;
   (ii) exposing the well to wet carbon dioxide after the cement composition has hardened in the well;
   (iii) forming an insoluble calcium salt of calcium fluoride, calcium borate, or combinations thereof from the additive and calcium cations, the calcium cations having been formed from carbonic acid in wet carbon dioxide; and
   (iv) preventing carbon dioxide from penetrating into the set cement by forming a protective barrier from the insoluble calcium salt, wherein the protective barrier protects the cement from corrosion and further prevents loss of integrity to the hardened cement.

2. The method of claim 1, wherein the additive is selected from the group consisting of $Na_2B_4O_7$, $Na_2B_4O_7 \cdot 10H_2O$, $B_2O_3$, $B_8Na_2O_{13}$, $BBr_3$, $BF_3$, $B_{10}H_{14}$, $B_2H_6$, $BH_3$, $K_2B_4O_7 \cdot 4H_2O$, $B(OH)_3$, $Na_4B_4O_7$ and its hydrate forms, $Na_2B_8O_{13}$ and its hydrate forms, or combinations thereof.

3. The method of claim 1, wherein the additive is present in a range of about 1 lb. per 500 lb. cement composition to about 100 lb. per 500 lb. cement composition.

4. The method of claim 1, wherein the additive is selected from the group consisting of NaF, KF, $NH_4F$, $[NH_4][HF_2]$, $NH_4F$, LiF, or combinations therefore.

5. The method of claim 1, wherein the insoluble salt comprises calcium fluoride.

6. The method of claim 1, wherein the cement applications comprise oilfield applications, smoke stacks, buildings, roadways, bridges, pilings, moorings, or combinations thereof.

7. The method of claim 1, wherein the additive is added prior to water being added to the cement composition.

8. A method of reducing corrosion in a cement composition comprising the steps of:
   forming a cement composition comprising Portland cement and an additive selected from the group consisting of NaF, KF, $[NH_4][HF_2]$, $NH_4F$, LiF, $Na_2B_4O_7$, $Na_2B_4O_7 \cdot 10H_2O$, $B_2O_3$, $B_8Na_2O_{13}$, $BBr_3$, $BF_3$, $B_{10}H_{14}$, $B_2H_6$, $BH_3$, $K_2B_4O_7 \cdot 4H_2O$, $B(OH)_3$, $Na_4B_4O_7$ and its hydrate forms, $Na_2B_8O_{13}$ and its hydrate forms, or combinations thereof;
   adding water and allowing the cement composition to set into a hard mass;
   exposing wet carbon dioxide to cement after the cement composition sets and hardens to produce a calcium cation; and
   reacting the calcium cation with the additive to produce an insoluble salt of calcium fluoride, calcium borate, or combinations thereof that protects the hard mass from corrosion.

9. The method of claim 8, wherein the additive is selected from the group consisting of $Na_2B_4O_7$, $Na_2B_4O_7 \cdot 10H_2O$, $B_2O_3$, $B_8Na_2O_{13}$, $BBr_3$, $BF_3$, $B_{10}H_{14}$, $B_2H_6$, $BH_3$, $K_2B_4O_7 \cdot 4H_2O$, $B(OH)_3$, $Na_4B_4O_7$ and its hydrate forms, $Na_2B_8O_{13}$ and its hydrate forms, or combinations thereof.

10. The method of claim 8, wherein the additive is selected from the group consisting of NaF, KF, $NH_4F$, $[NH_4][HF_2]$, $NH_4F$, LiF, or combinations therefore.

11. The method of claim 8, wherein the additive is present in a range of about 1 lb. per 500 lb. cement composition to about 100 lb. per 500 lb. cement composition.

12. The method of claim 8, wherein the insoluble salt comprises calcium fluoride.

13. The method of claim 8, wherein corrosion is reduced in a cement composition used in a cement application comprising oilfield applications, smoke stacks, buildings, roadways, bridges, pilings, moorings, or combinations thereof.

14. A method of reducing corrosion in a cement composition exposed to wet carbon dioxide by preventing the propagation of carbonic acid within the cement, the method comprising the steps of:
   (a) forming a cement composition comprising Portland cement and an additive selected from the group consisting of NaF, KF, $[NH_4][HF_2]$, $NH_4F$, LiF, $Na_2B_4O_7$, $Na_2B_4O_7 \cdot 10H_2O$, $B_2O_3$, $B_8Na_2O_{13}$, $BBr_3$, $BF_3$, $B_{10}H_{14}$, $B_2H_6$, $BH_3$, $K_2B_4O_7 \cdot 4H_2O$, $B(OH)_3$, $Na_4B_4O_7$ and its hydrate forms, $Na_2B_8O_{13}$ and its hydrate forms, or combinations thereof;
   (b) adding water and allowing the cement composition to set into a hard mass;
   (c) exposing the wet carbon dioxide to the cement after the cement composition sets and hardens to produce a calcium cation;
   (d) reacting the calcium cation with the additive to form an insoluble salt of calcium fluoride, calcium borate, or combinations thereof; and
   (e) preventing the propagation of carbonic acid within the cement by forming a protective barrier within the cement from the insoluble salt of step (d).

15. The method of claim 14, wherein the additive is present in a range of about 1 lb. per 500 lb. cement composition to about 100 lb. per 500 lb. cement composition.

16. The method of claim 14, wherein the insoluble salt comprises calcium fluoride.

17. The method of claim 14, wherein the cement composition further comprises a member selected from the group consisting of glass, dispersing agents, fluid loss additives, hydrogen foaming agents, and combinations thereof.

18. The method of claim 14, wherein the additive is selected from the group consisting of $Na_2B_4O_7$, $Na_2B_4O_7 \cdot 10H_2O$, $B_2O_3$, $B_8Na_2O_{13}$, $BBr_3$, $BF_3$, $B_{10}H_{14}$, $B_2H_6$, $BH_3$, $K_2B_4O_7 \cdot 4H_2O$, $B(OH)_3$, $Na_4B_4O_7$ and its hydrate forms, $Na_2B_8O_{13}$ and its hydrate forms, or combinations thereof.

19. The method of claim 14, wherein the additive is selected from the group consisting of NaF, KF, $NH_4F$, $[NH_4][HF_2]$, $NH_4F$, LiF, or combinations therefore.

\* \* \* \* \*

UNITED STATES PATENT AND TRADEMARK OFFICE
CERTIFICATE OF CORRECTION

PATENT NO.        : 8,636,068 B2
APPLICATION NO.   : 12/180577
DATED             : January 28, 2014
INVENTOR(S)       : Mark Alan Vorderbruggen, Richard F. Stevens and Qi Qu It is certified that error appears in the above-identified patent and that said Letters Patent is hereby corrected as shown below:

In the Claims:

Column 8, line 50.   Line 50 should read  -  $K_2B_4O_7 \cdot 4H_2O$, -

Column 8, line 66.   Line 66 should read  -  $Na_2B_4O_7.10H_2O$, -

Column 9, line 22.   Line 22 should read  -  $K_2B_4O_7 \cdot 4H_2O$, -

Column 9, line 35.   Line 35 should read  -  $Na_2B_4O_7.10H_2O$, -

Column 9, line 37.   Line 37 should read  -  $K_2B_4O_7 \cdot 4H_2O$, -

Column 10, line 13.  Line 13 should read  -  $K_2B_4O_7 \cdot 4H_2O$, -

Column 10, line 39.  Line 39 should read  -  $K_2B_4O_7 \cdot 4H_2O$, -

Signed and Sealed this
Fifteenth Day of April, 2014

Michelle K. Lee
*Deputy Director of the United States Patent and Trademark Office*